United States Patent
Moore et al.

(10) Patent No.: US 9,703,964 B2
(45) Date of Patent: Jul. 11, 2017

(54) METHOD AND APPARATUS FOR VERIFYING BATTERY AUTHENTICITY

(71) Applicant: Radio Systems Corporation, Knoxville, TN (US)

(72) Inventors: William Peter Moore, Knoxville, TN (US); Steven Roger Floyd, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 14/559,568

(22) Filed: Dec. 3, 2014

(65) Prior Publication Data

US 2015/0156016 A1    Jun. 4, 2015

Related U.S. Application Data

(60) Provisional application No. 61/911,150, filed on Dec. 3, 2013.

(51) Int. Cl.

| | |
|---|---|
| G06F 21/60 | (2013.01) |
| A01K 15/02 | (2006.01) |
| G06F 21/44 | (2013.01) |
| H04L 9/08 | (2006.01) |
| H04L 9/12 | (2006.01) |

(52) U.S. Cl.
CPC .......... *G06F 21/602* (2013.01); *A01K 15/023* (2013.01); *G06F 21/44* (2013.01); *H04L 9/0841* (2013.01); *H04L 9/12* (2013.01); *G06F 2221/2129* (2013.01)

(58) Field of Classification Search
CPC ............... G06F 21/602; G06F 21/44; G06F 2221/2129; H04L 9/12; H04L 9/0841; A01K 15/023

See application file for complete search history.

(56) References Cited

U.S. PATENT DOCUMENTS

| | | | | |
|---|---|---|---|---|
| 5,445,900 A | * | 8/1995 | Miller, Jr. ........... | H01M 2/1055 429/1 |
| 5,476,729 A | * | 12/1995 | Miller, Jr. ........... | H01M 2/1055 429/1 |
| 5,533,469 A | | 7/1996 | Touchton et al. | |
| 5,724,919 A | * | 3/1998 | Boyd ................... | A01K 15/021 119/719 |

(Continued)

*Primary Examiner* — Joseph P Hirl
*Assistant Examiner* — J. Brant Murphy
(74) *Attorney, Agent, or Firm* — Baker, Donelson, Bearman, Caldwell

(57) ABSTRACT

A communication channel between a first processor of a receiver and a second processor of a battery assembly is provided. The battery assembly requests a public key from the receiver. The receiver combines the public key with a private key stored in memory to form a first combined public key, applies a first hash function to the first combined public key, stores the resulting first hash value in memory and transmits the public key to the battery assembly. The battery assembly combines the public key with a corresponding private key to form a second combined public key, applies a corresponding hash function to the second combined public key and transmits the resulting second hash value to the receiver. The receiver compares the first hash value to the second hash value and enables operations of the receiver when the first hash value equals the second hash value.

23 Claims, 2 Drawing Sheets

(56) References Cited

U.S. PATENT DOCUMENTS

| | | |
|---|---|---|
| 5,794,569 A | 8/1998 | Titus et al. |
| 5,870,973 A | 2/1999 | Touchton et al. |
| 6,095,092 A | 8/2000 | Chou |
| 6,374,778 B1 | 4/2002 | Glussich |
| 6,549,133 B2 | 4/2003 | Duncan et al. |
| 6,657,544 B2 | 12/2003 | Barry et al. |
| 6,788,199 B2 | 9/2004 | Crabtree et al. |
| 6,836,650 B2 | 12/2004 | Sorrells et al. |
| 6,928,958 B2 | 8/2005 | Crist et al. |
| 6,956,483 B2 | 10/2005 | Schmitt et al. |
| 6,990,317 B2 | 1/2006 | Arnold |
| 7,046,152 B1* | 5/2006 | Peinetti ............ A01K 15/023 119/721 |
| 7,068,174 B1* | 6/2006 | Peinetti ............ A01K 15/023 119/720 |
| 7,117,822 B1* | 10/2006 | Peinetti ............ A01K 15/023 119/719 |
| 7,204,204 B1* | 4/2007 | Peinetti ............ A01K 15/023 119/721 |
| 7,278,376 B1* | 10/2007 | Peinetti ............ A01K 15/023 119/721 |
| 7,495,570 B1* | 2/2009 | Peinetti ............ A01K 15/023 119/712 |
| 7,546,817 B2 | 6/2009 | Moore |
| 7,552,699 B2 | 6/2009 | Moore |
| 7,565,885 B2 | 7/2009 | Moore |
| 7,667,607 B2* | 2/2010 | Gerig ............ A01K 15/021 340/573.1 |
| 7,705,736 B1 | 4/2010 | Kedziora |
| 7,709,136 B2 | 5/2010 | Touchton et al. |
| 7,779,788 B2 | 8/2010 | Moore |
| 8,047,161 B2 | 11/2011 | Moore |
| 8,296,565 B2 | 10/2012 | Taylor |
| 8,342,135 B2 | 1/2013 | Peinetti et al. |
| 8,424,092 B2 | 4/2013 | Ikeuchi et al. |
| 8,710,996 B1 | 4/2014 | Gronneberg |
| 8,803,692 B2 | 8/2014 | Goetzl et al. |
| 8,820,626 B2 | 9/2014 | Rich et al. |
| 9,596,085 B2* | 3/2017 | Prakash ............ H04L 9/3226 |
| 2003/0102842 A1* | 6/2003 | Tamai ............ H01M 10/4285 320/106 |
| 2005/0035865 A1 | 2/2005 | Brennan et al. |
| 2005/0241926 A1* | 11/2005 | Groh ............ A01K 15/021 200/50.2 |
| 2006/0102100 A1* | 5/2006 | Becker ............ A01K 15/021 119/720 |
| 2006/0207520 A1* | 9/2006 | Moore ............ A01K 15/021 119/720 |
| 2007/0123316 A1* | 5/2007 | Little ............ G06F 21/31 455/573 |
| 2007/0137589 A1* | 6/2007 | Gerig ............ A01K 15/021 119/859 |
| 2007/0260892 A1* | 11/2007 | Paul ............ G06F 21/31 713/193 |
| 2007/0277749 A1* | 12/2007 | Moore ............ A01K 15/022 119/720 |
| 2007/0289554 A1* | 12/2007 | Moore ............ A01K 15/021 119/721 |
| 2008/0017133 A1* | 1/2008 | Moore ............ A01K 15/023 119/720 |
| 2008/0163827 A1 | 7/2008 | Goetzl |
| 2008/0168950 A1* | 7/2008 | Moore ............ A01K 15/023 119/721 |
| 2008/0245316 A1* | 10/2008 | Peinetti ............ A01K 15/023 119/719 |
| 2008/0264352 A1* | 10/2008 | Peinetti ............ A01K 15/023 119/856 |
| 2010/0154721 A1 | 6/2010 | Gerig et al. |
| 2010/0231391 A1 | 9/2010 | Dror et al. |
| 2010/0315241 A1 | 12/2010 | Jow |
| 2011/0213977 A1* | 9/2011 | Little ............ H04L 9/0844 713/171 |
| 2011/0270480 A1* | 11/2011 | Ishibashi ............ B60L 11/1801 701/22 |
| 2012/0011294 A1* | 1/2012 | Shankar ............ G06F 21/81 710/305 |
| 2012/0027212 A1* | 2/2012 | Ruland ............ H04L 9/12 380/278 |
| 2012/0037088 A1 | 2/2012 | Altenhofen |
| 2015/0172054 A1* | 6/2015 | Prakash ............ G06F 21/44 713/189 |
| 2015/0173327 A1* | 6/2015 | Gerig ............ A01K 15/023 119/721 |

* cited by examiner

METHOD AND APPARATUS FOR VERIFYING BATTERY AUTHENTICITY

CROSS REFERENCE TO RELATED APPLICATIONS

This application claims the benefit of U.S. patent application Ser. No. 61/911,150, filed Dec. 3, 2013.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BRIEF DESCRIPTION OF THE DRAWINGS

So that the manner in which the present application can be better understood, certain illustrations and figures are appended hereto. It is to be noted, however, that the drawings illustrate only selected embodiments and elements of a method and apparatus for verifying battery authenticity and are therefore not to be considered limiting in scope for such method and apparatus as described herein may admit to other equally effective embodiments and applications.

DETAILED DESCRIPTION

Electronic pet containment systems have been in common use to control the movement of animals relative to a predefined area. In general, these pet containment systems monitor the position of the animal relative to the predefined area and function to provide a stimulus to the animal in order to control the movement of the animal. For example, if it is determined that the animal has moved outside a designated area, an electronic receiver carried by the animal detects a transmitted signal and applies a stimulus, such as a harmless shock or desired noise, to the animal, indicating to the animal that it has moved outside the allowed area. Within a short period of time, the animal responds to the applied stimulus and becomes trained to remain within the allowed area.

The electronic receivers carried by the animals are typically powered by batteries. The batteries contained in the electronic receivers have a limited life and, accordingly, must be replaced on a regular basis. A battery pack assembly is provided for insertion into a receptacle of an electronic receiver. It should be noted that an electronic receiver may be part of a collar or other pet product assembly.

The Invisible Fence product is just one example of a pet containment system. This pet containment product utilizes under one embodiment a battery assembly that provides power to components of a pet product and/or collar including an electronic receiver of such pet collar and/or product. The custom design of the battery provides several advantages including one or more of the following features:

a battery assembly comprises a single piece design that is simple to insert or remove with respect to a pet collar under an embodiment a battery assembly includes an o-ring in order to maintain a water tight seal when the battery assembly is coupled with the pet collar under an embodiment a battery assembly cannot be inserted backwards into a pet collar under an embodiment Embodiments of a battery assembly are further described in U.S. Pat. No. 5,445,900 and U.S. Pat. No. 5,476,729 both of which are incorporated herein by reference. A method and apparatus for authenticating a battery to the receiver of a pet product containment system are described herein.

In the disclosure set forth below, a battery assembly includes circuitry enabling communications between the battery apparatus/assembly (also referred to as an apparatus/assembly circuit) and the electronic receiver that receives (and is powered by) the battery assembly. Under embodiments described herein, a receiver communicates with and authenticates the battery assembly prior to enabling operation of the pet product.

Figure 1:
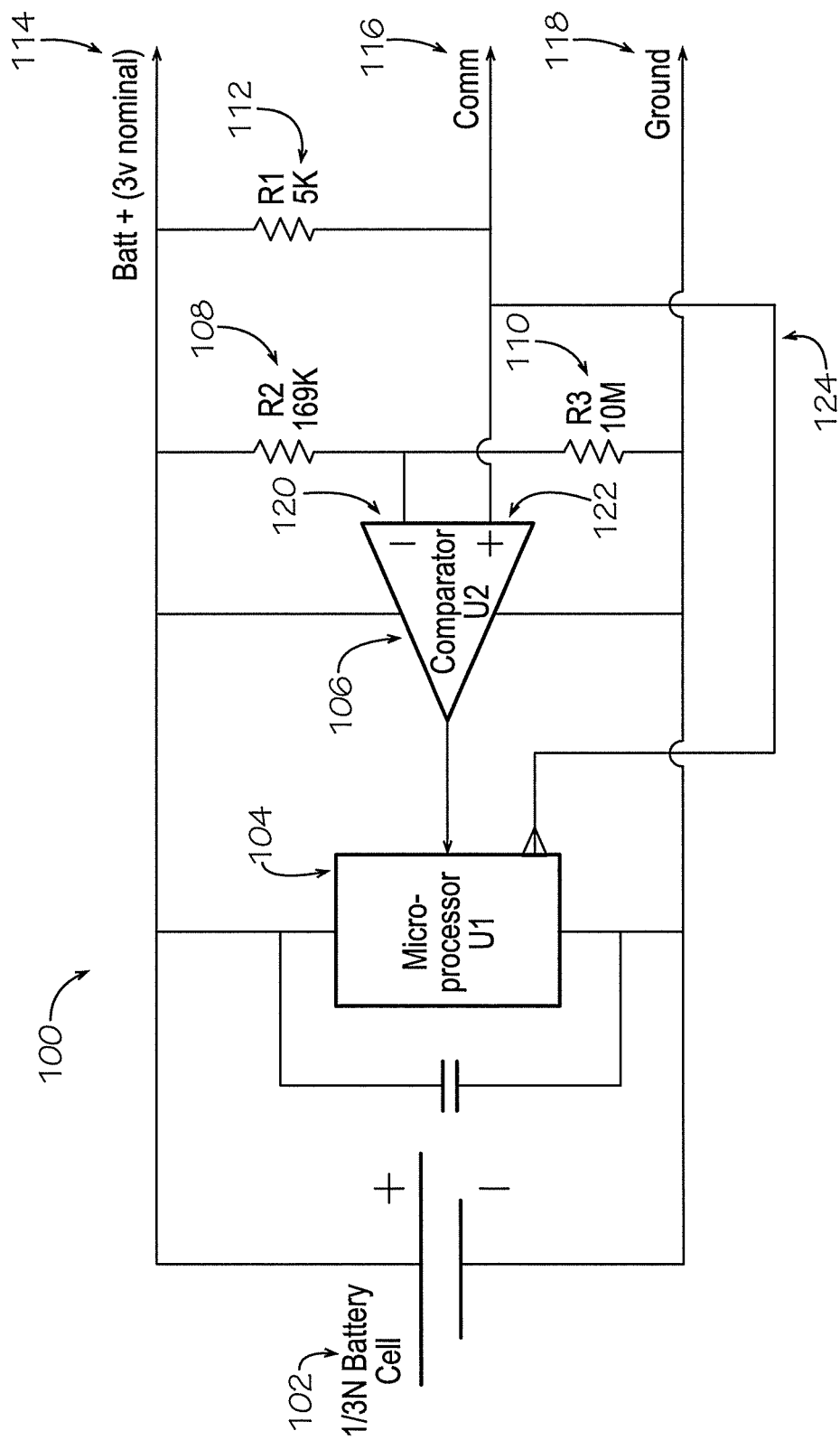
FIG. 1 is a diagram of a block assembly circuit under an embodiment.

An embodiment of a battery apparatus is described that allows for the electrical communication between the battery assembly 100 and the receiver. The battery apparatus contains a microcontroller 104, comparator 106, and supporting circuitry. FIG. 1 is a circuit diagram of the electrical components of a battery assembly circuit under an embodiment. The circuit as shown in FIG. 1 is under such embodiment entirely contained within the battery assembly described above.

The battery assembly circuit is coupled to a ⅓N battery cell 102. The circuit couples with a pet product (not shown) at a 3V positive terminal 114 connection and a ground 118 connection. These terminal points connect to corresponding connection points in a battery compartment of the pet product. The circuit further provides a communications terminal 116 that provides a communications pathway between the battery assembly 100 and a third terminal of the pet product.

The circuit components are powered by the battery cell 102. The data communications line 116 couples the microprocessor 104 and the comparator 106 to the third terminal of the battery compartment of the pet product. This third terminal in the battery compartment is normally used for production test and field configuration data transport. Under embodiments described herein, the third terminal connects to the communication line 116 to provide a dedicated communication channel between battery assembly and receiver.

The microcontroller circuit 104 is designed to draw approximately 700 nA (or less) when idle to therefore have minimal drain (<20% after 5 years with a nominal capacity ⅓N type (~160 mAh) battery cell) while in storage before receipt by the customer. The battery assembly 100 is backwards compatible with the existing battery interface of legacy products. In other words, existing battery interfaces include three terminals that may connect (as described above) with the positive 114, ground 116, and communications 118 terminals of the assembly circuit to provide authentication functionality as described herein. New pet products in the Invisible Fence product line (or any pet containment product that may use the new battery assembly) may require authenticating communications with the battery apparatus in order to enable full operation of a pet product receiver. Otherwise, the battery apparatus is also designed to work in legacy products that are unaware of authentication communications and do not require battery authentication for operation of such product.

Referring to FIG. 1, resistor R1 112 is a pull-up resistor to the battery voltage. It enables the pet product to recognize that a battery is inserted. It is kept to a low value to allow pet products to apply a voltage divider to this line when testing the battery voltage. Keeping R1 112 to a value of 5K ohm or less allows for <1% error in the battery voltage measurement when a pet product uses a 522K voltage divider. Resistors R2 108 and R3 110 compensate for the input offset voltage of the comparator and set the comparator threshold.

Data Transfer from Pet Product (Receiver) to Battery

Under one embodiment, R2 is 169K and R3 is 10 M and are connected in series. Acting as a voltage divider, R2 and R3 establish a voltage of approximately 2.95V at Vin− 120 of the comparator 106. When the communication line 116 transmits data zero, the line 116 sees an impedance of 100K (i.e. an internal impedance of the receiver) which produces approximately a 143 mV drop across R1 112. The comparator 106 detects this small voltage drop and converts it to logic 0. In other words, the voltage at Vin− 120 exceeds the voltage at Vin+ 122 which the comparator then interprets as zero. When the communication line 116 transmits data one, the prior 100K impedance seen by the communication line becomes essentially infinite (i.e., connection to ground is broken) at which point voltage on the communication line 116 is pulled up to approximately the 3V source voltage. The resulting voltage at Vin+ 122 then exceeds the voltage at Vin− 120 (corresponding to a voltage drop across R1 less than ~50 mV) which the comparator interprets as zero.

It is of course understood that the battery assembly processor 104 may transmit digital data back to the receiver using the same communication line 116. It should be noted that any different values may be selected for R1, R2 and R3 than those described above with respect to the circuit shown in FIG. 1. Differing resistor values may be selected to achieve the same or differing functionality of the assembly circuit described above. In like manner, differing battery and microprocessor components may be selected to achieve similar of differing functionality of the battery assembly circuit described above. Further, both the receiver circuitry and battery assembly circuitry may include memory and may store data in and retrieve data from such memory.

Data Transfer from Battery to Pet Product

Data is transmitted from the battery to the pet product directly through line 124 which connects microprocessor 104 to communications terminal 116 of the battery. The microprocessor may transmit logic zeros and ones through any number of modulation or data transfer methods whereby one or more applications running on at least one processor of a pet product is configured to demodulate or otherwise interpret such binary data transmission.

Authentication Communications between Pet Product (Receiver) and Battery Assembly The pet product operates as a SLAVE device to the battery assembly under one embodiment. Accordingly, the battery assembly is the communication MASTER. After connecting a battery assembly to the pet product (i.e. after the assembly and electronic receiver of such product are communicatively coupled), the receiver may under an embodiment begin sending SYNC pulses. The receiver may for example send SYNC pulses three times per second. Upon detection of a SYNC pulse (or other first communication), the battery assembly attempts to ask the receiver for a public key which under one embodiment is a ~224 bit binary number. This number may or may not be different every time the battery asks for such number from the pet product.

Under an alternative embodiment the battery assembly may initiate communications with the receiver. Under such embodiment, the battery assembly begins sending SYNC pulses. The battery assembly may for example send SYNC pulses three times per second. Upon the receiver's detection of a SYNC pulse (or other first communication) and establishment of a communication channel, the battery assembly may ask the receiver for a public key.

The transmission of a public key from receiver to battery assembly during an authentication process is described below.

Note that both the product receiver and the battery assembly circuit use this same public key number as the basis of an input to a cryptographic hash function respectively programmed into the circuitry of the receiver and battery assembly. A cryptographic hash function is a hash function that takes an arbitrary block of data and returns a fixed-size bit string, i.e. the cryptographic hash value, such that any (accidental or intentional) change to the input data will (with very high probability) change the hash value. The product receiver applies the hash function and then temporarily stores the result (hash value) in a memory of such receiver. The microprocessor of the battery assembly uses the same public key in like manner to provide input to the same cryptographic hash function. The microprocessor in the battery performs the same cryptographic hash function on such input and then communicates the resulting hash value back to the receiver. If the returned result matches the temporarily stored hash value, then the product receiver acknowledges the match, and enables operation of the pet product. If the result does not match, then the pet product would either fail to respond with an ACK (acknowledge) or instead respond with a NAK (Negative Acknowledge). In either case, the product receiver may or may not operate with reduced functionality (or cease to function at all) when an unauthorized battery is detected.

An embodiment described above discloses that a receiver calculates and stores a hash value before transmitting the public key to the battery assembly. Under alternative embodiments, it may be that the receiver does not compute a hash value with respect to the public key until after it receives a hash value that was computed by the battery assembly. Further, the timing/execution of receiver and assembly side hashing operations may be independent of one another. In yet another embodiment, comparison/analysis of computed hash values may occur within the battery assembly or through cooperation of both the receiver and battery assembly.

Under one embodiment, the product receiver and battery assembly use a public key as an input to a cryptographic hash function. However, prior to application of the hash function, the microprocessor of the battery assembly combines the public key with a private key which is stored in a memory of the assembly circuit. In similar manner, the product receiver combines the public key with the same private key (also stored in a memory of the receiver) prior to application of the hash algorithm. The public key is product receiver specific and may comprise information derived from a product receiver model and/or serial number. In other words, the public key is a unique identifier of a particular receiver. Under alternative embodiments, a receiver may provide a different public key during each authentication process. Under such embodiment, each new public key may still be a function of identifying information of the receiver and therefore unique to such receiver.

The transmission of a public key from receiver to battery assembly during an authentication process is described above. Under an alternative embodiment, the receiver may request/receive a public key from the battery assembly during an analogous authentication procedure.

Figure 2:
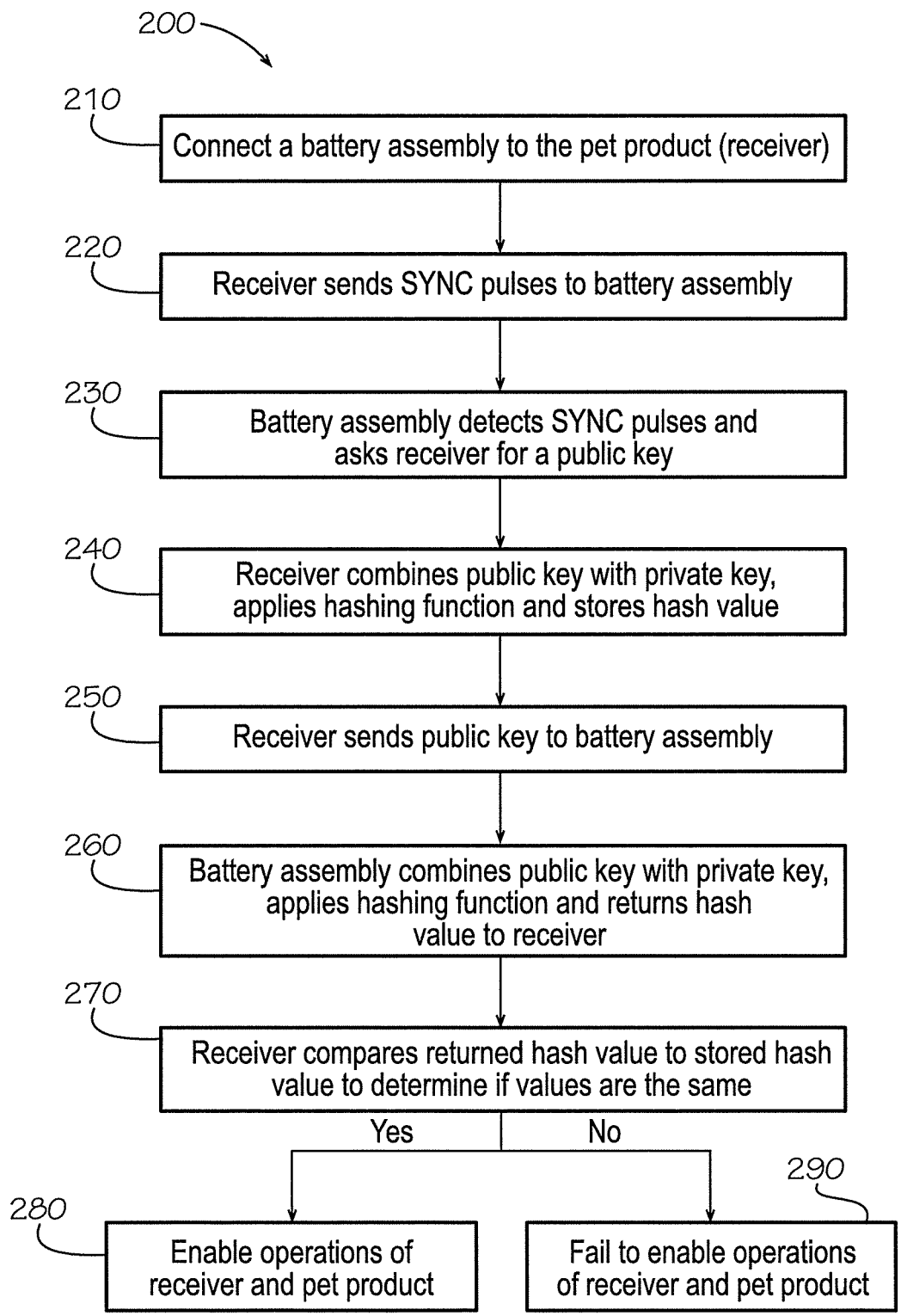
FIG. 2 is flowchart showing steps of an authentication process between battery assembly and receiver under an embodiment.

FIG. 2 is a flowchart showing steps of the authentication process between battery assembly and receiver under one embodiment. In step 210 a battery assembly is connected to the pet product (receiver). The receiver at step 220 then sends SYNC pulses to battery assembly. The battery assembly detects SYNC pulses and asks receiver for a public key 230. The receiver at step 240 combines the public key with a private key, applies a hash function and stores the hash value. At step 250, the receiver sends the public key to the battery assembly. The battery assembly combines the public key with a private key, applies the hash function and returns a hash value to receiver 260. The receiver compares returned hash value to stored hash value to determine whether the values are the same 270. The receiver enables operations of receiver and corresponding pet product system if the values are the same 280. Otherwise, the receiver does not enable such operations or may operate with reduced functionality.

Under one embodiment of the battery assembly, the assembly circuit may provide additional authentication information during the initial public key exchange. This additional information may comprise "feature" data, i.e. the additional information may include product codes corresponding to one or more product features of a pet containment systems. During the public key exchange, the battery assembly may provide the "feature" data to the receiver. Under this embodiment, the receiver may process the "feature" data and provide or rather unlock certain features of the product receiver and corresponding pet containment system.

It is understood that various key exchange protocols and cryptographic methods may be used to implement the authentication process described above. As just one example, Diffie-Hellman key exchange may be used under an embodiment. This is a method of exchanging cryptographic keys. The Diffie-Hellman key exchange method allows two parties that have no prior knowledge of each other to jointly establish a shared secret key over an insecure communications channel. This key can then be used to encrypt subsequent communications using a symmetric key cipher. It is understood that embodiments are not so limited and that additional key exchanges or secure communication channels between receiver and battery assembly circuit may be implemented.

The system and methods described herein include a battery authentication system that comprises a receiver and a battery assembly. The receiver comprises a first processor and a first memory. The battery assembly comprises a second processor and a second memory.

Embodiments described herein include coupling the battery assembly with the receiver, the coupling including providing a communication channel between the first processor of the receiver and the second processor of the battery assembly. The first processor of the receiver or the second processor of the battery assembly transmit a first communication to establish the communication channel. The second processor of the battery assembly requests a key from the receiver. The first processor of the receiver transmits the key to the second processor of the battery assembly. The first processor of the receiver applies a first function to the key to obtain a first value and stores the first value in the first memory. The second processor of the battery assembly applies a second function to the key to obtain a second value and transmits the second value to the first processor of the receiver. The first processor of the receiver compares the first value to the second value and enables one or more operations of the receiver if one or more criteria are met.

The battery assembly of an embodiment includes a comparator.

Embodiments described herein include providing the communication channel using the comparator to read digital data from the receiver.

Embodiments described herein include transmitting the key and the second value using at least one cryptographic key exchange protocol.

The at least one cryptographic key exchange protocol of an embodiment comprises a Diffie-Hellman key exchange protocol.

The first function of an embodiment is equal to the second function.

The first function of an embodiment is a cryptographic hash function.

The second function of an embodiment is a cryptographic hash function.

The key of an embodiment is a public key.

The public key of an embodiment is a 224 bit binary number.

The public key of an embodiment is receiver specific.

The public key of an embodiment comprises information derived from one or more of a product model and a product serial number corresponding to the receiver.

The first processor of the receiver transmitting the public key to the second processor of the battery assembly of an embodiment includes providing a different public key for each request.

The first processor of the receiver applying the first function of an embodiment includes the first processor combining the key with a first private key stored in the first memory to provide a first combined key.

The applying the first function of an embodiment includes applying the first function to the first combined key.

The second processor of the battery assembly applying the second function of an embodiment includes combining the key with a second private key stored in the second memory to provide a second combined key.

The applying the second function of an embodiment includes applying the second function to the second combined key.

The first private key of an embodiment is equal to the second private key.

The first combined key of an embodiment is equal to the second combined key.

The transmitting the first communication of an embodiment comprises sending synchronization pulses.

The transmitting the first communication of an embodiment comprises sending three synchronization pulses per second.

The first processor of the receiver transmits the first communication.

The second processor of the battery assembly of an embodiment transmits the first communication.

The one or more criteria of an embodiment includes the first value equaling the second value.

Embodiments described herein include a battery authentication system that comprises a receiver and a battery assembly. The receiver comprises a first processor and a first memory. The battery assembly comprises a second processor, a comparator and a second memory. Embodiments described herein connect the battery assembly to the receiver, the connecting including providing a communication channel between the first processor of the receiver and the second processor of the battery assembly using the comparator. The first processor of the receiver or the second processor of the battery assembly transmits a first communication to establish the communication channel. The second processor of the battery assembly requests a public key from the receiver. The first processor of the receiver combines the public key with a first private key stored in the first memory, applies a first hash function to the first combined public key, and stores a first hash value in the first memory. The first processor transmits the public key to the second processor of the battery assembly. The second processor of the battery assembly combines the public key with a second private key stored in the second memory, applies a second hash function to the second combined public key and transmits a second hash value to the first processor of the receiver. The first private key is equal to the second private key. The first hash function is the same as the second hash function. The first processor of the receiver compares the first hash value to the second hash value and enables operations of the receiver when the first hash value equals the second hash value.

The system, method, and apparatus of authenticating a battery assembly can be a component of a single system, multiple systems, and/or geographically separate systems. Such systems, methods and apparatus can also be a sub-component or subsystem of a single system, multiple systems, and/or geographically separate systems. The system, method, and apparatus of authenticating a battery assembly components can be coupled to one or more other components (not shown) of a host system or a system coupled to the host system.

One or more components of the system, method, and apparatus of authenticating a battery assembly and/or a corresponding interface, system or application to which the system, method, and apparatus of authenticating a battery assembly is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the system, method, and apparatus of authenticating a battery assembly can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or back-end networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the system, method, and apparatus of authenticating a battery assembly and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system, method, and apparatus of authenticating a battery assembly and corresponding systems and methods include: microcontrollers with memory (such as electronically erasable programmable read only memory (EEPROM)), embedded microprocessors, firmware, software, etc. Furthermore, aspects of the system, method, and apparatus of authenticating a battery assembly and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the system, method, and apparatus of authenticating a battery assembly and corresponding systems and methods is not intended to be exhaustive or to limit the systems and methods to the precise forms disclosed. While specific embodiments of, and examples for, the system, method, and apparatus of authenticating a battery assembly and corresponding systems and methods are described herein for illustrative purposes, various equivalent modifications are possible within the scope of the systems and methods, as those skilled in the relevant art will recognize. The teachings of the system, method, and apparatus of authenticating a battery assembly and corresponding systems and methods provided herein can be applied to other systems and methods, not only for the systems and methods described above.

The elements and acts of the various embodiments described above can be combined to provide further embodiments. These and other changes can be made to the system, method, and apparatus of authenticating a battery assembly and corresponding systems and methods in light of the above detailed description.

What is claimed is:

1. A battery authentication system comprising:
a receiver and a battery assembly, the receiver comprising a first processor and a first memory, the battery assembly comprising a second processor and a second memory, wherein the battery assembly is coupled with the receiver, the coupling including a communication channel between the first processor of the receiver and the second processor of the battery assembly;
the first processor of the receiver or the second processor of the battery assembly transmitting a first communication to establish the communication channel;
the second processor of the battery assembly requesting a key from the receiver;
the first processor of the receiver transmitting the key to the second processor of the battery assembly;
the first processor of the receiver combining the key with a first private key stored in the first memory to provide a first combined key, applying a first function to the first combined key to obtain a first value, and storing the first value in the first memory;
the second processor of the battery assembly combining the key with a second private key stored in the second memory to provide a second combined key, applying a second function to the second combined key to obtain a second value, and transmitting the second value to the first processor of the receiver;
the first processor of the receiver comparing the first value to the second value and enabling a first set of receiver operations in response to one or more criteria being met and a second set of receiver operations in response to the one or more criteria not being met, wherein the first set of receiver operations include at least one receiver operation that is not included in the second set of receiver operations.

2. The system of claim 1, wherein the battery assembly includes a comparator.

3. The system of claim 2, wherein the providing the communication channel includes using the comparator to read digital data from the receiver.

4. The system of claim 1, wherein the transmitting the key and the second value includes using at least one cryptographic key exchange protocol.

5. The system of claim 4, the at least one cryptographic key exchange protocol comprising a Diffie-Hellman key exchange protocol.

6. The system of claim 1, wherein the first function is equal to the second function.

7. The system of claim 1, wherein the first function is a cryptographic hash function.

8. The system of claim 1, wherein the second function is a cryptographic hash function.

9. The system of claim 1, wherein the key is a public key.

10. The system of claim 9, wherein the public key is a 224 bit binary number.

11. The system of claim 9, wherein the public key is receiver specific.

12. The system of claim 11, wherein the public key comprises information derived from one or more of a product model and a product serial number corresponding to the receiver.

13. The system of claim 11, wherein the first processor of the receiver transmitting the public key to the second processor of the battery assembly includes providing a different public key for each request.

14. The system of claim 1, wherein the first private key is equal to the second private key.

15. The system of claim 14, wherein the first combined key is equal to the second combined key.

16. The system of claim 1, wherein the transmitting the first communication comprises sending synchronization pulses.

17. The system of claim 16, wherein the transmitting the first communication comprises sending three synchronization pulses per second.

18. The system of claim 16, wherein the first processor of the receiver transmits the first communication.

19. The system of claim 16, wherein the second processor of the battery assembly transmits the first communication.

20. The system of claim 1, the one or more criteria including the first value equaling the second value.

21. A battery authentication system comprising,
a receiver and a battery assembly, the receiver comprising a first processor and a first memory, the battery assembly comprising a second processor, and a second memory, wherein the battery assembly is coupled to the receiver, wherein the coupling provides a communication channel between the first processor of the receiver and the second processor of the battery assembly;
the first processor of the receiver or the second processor of the battery assembly transmitting a first communication to establish the communication channel;
the second processor of the battery assembly requesting a public key from the receiver;
the first processor of the receiver combining the public key with a first private key stored in the first memory to provide a first combined public key, applying a first hash function to the first combined public key to obtain a first hash value, and storing the first hash value in the first memory;
the first processor transmitting the public key to the second processor of the battery assembly;
the second processor of the battery assembly combining the public key with a second private key stored in the second memory, applying a second hash function to the second combined public key to obtain a second hash value, and transmitting the second hash value to the first processor of the receiver, wherein the first private key is equal to the second private key, wherein the first hash function is the same as the second hash function;
the first processor of the receiver comparing the first hash value to the second hash value and enabling a first set of receiver operations when the first hash value equals the second hash value and a second set of receiver operations when the first hash value does not equal the second hash value, wherein the first set of receiver operations include at least one receiver operation that is not included in the second set of receiver operations.

22. A battery authentication system comprising:
a receiver and a battery assembly, the receiver comprising a first processor and a first memory, the battery assembly comprising a second processor and a second memory, wherein the battery assembly is coupled with the receiver, the coupling including a communication channel between the first processor of the receiver and the second processor of the battery assembly;
the first processor of the receiver or the second processor of the battery assembly transmitting a first communication to establish the communication channel;
the second processor of the battery assembly requesting a public key from the receiver;
the first processor of the receiver transmitting the public key to the second processor of the battery assembly, wherein the first processor of the receiver transmitting the public key to the second processor of the battery assembly includes providing a different public key for each request;
the first processor of the receiver combining the public key with a first private key stored in the first memory to provide a first combined key, applying a first function to the first combined key to obtain a first value, and storing the first value in the first memory;
the second processor of the battery assembly combining the public key with a second private key stored in the second memory to provide a second combined key, applying a second function to the second combined key to obtain a second value and transmitting the second value to the first processor of the receiver;
the first processor of the receiver comparing the first value to the second value and enabling a first set of receiver operations in response to the one or more criteria being met and a second set of receiver operations in response to the one or more criteria not being met, wherein the first set of receiver operations include at least one receiver operation that is not included in the second set of receiver operations.

23. A battery authentication system comprising:
a receiver and a battery assembly, the receiver comprising a first processor and a first memory, the battery assembly comprising a second processor and a second memory, wherein the battery assembly is coupled with the receiver, the coupling including a communication channel between the first processor of the receiver and the second processor of the battery assembly;
the first processor of the receiver or the second processor of the battery assembly transmitting a first communication to establish the communication channel;
the second processor of the battery assembly requesting a key from the receiver;
the first processor of the receiver transmitting the key to the second processor of the battery assembly;
the first processor of the receiver combining the key with a first private key stored in the first memory to provide a first combined key, applying a first function to the first combined key to obtain a first value, and storing the first value in the first memory;
the second processor of the battery assembly combining the key with a second private key stored in the second memory to provide a second combined key, applying a second function to the second combined key to obtain a second value, and transmitting the second value to the first processor of the receiver;
the second processor transmitting at least one product code to the first processor of the receiver, wherein the first processor of the receiver identifies a first set of receiver operations using the at least one product code;
the first processor of the receiver comparing the first value to the second value and enabling the first set of receiver operations in response to one or more criteria being met and a second set of receiver operations in response to the one or more criteria not being met, wherein the first set of receiver operations include at least one receiver operation that is not included in the second set of receiver operations.

* * * * *